Feb. 20, 1934. J. H. MOFFAT 1,948,043
SPARE TIRE VEHICLE PARKING DEVICE
Filed April 4, 1933 2 Sheets-Sheet 2

Inventor
JOHN H. MOFFAT
By Owen H. Spencer
Attorney

Patented Feb. 20, 1934

1,948,043

UNITED STATES PATENT OFFICE 1,948,043

SPARE TIRE VEHICLE PARKING DEVICE

John H. Moffat, Indianapolis, Ind.

Application April 4, 1933. Serial No. 664,293

10 Claims. (Cl. 180—1)

The invention is a parking mechanism for automobiles, and pertains more especially to automobile parking devices embodied with and carried with the autmobile, subject to instant use at the will of the operator; and the invention consists substantially in the construction, combination and arrangement of elements hereinafter described and pointed out more particularly in the claims.

It is an object of the invention to provide a mechanism for manipulating the spare tire carrier of an automobile as a means for shifting the respective end of the automobile laterally during the process of parking "flat to curb" between other automobiles or the like.

It is a primary object of the invention to provide parking a mechanism of this class in which the spare tire carrier is, both brought into use at will, by power from the propulsion power source of the vehicle, and rotated by power from the source during the parking operation.

It is also an object to provide a parking mechanism of this class by which the spare tire and carrier as well as the mechanism for supporting same is carried independently of the sprung weight of the vehicle, and which thus avoids lifting the vehicle body in relation to the unsprung weight of the vehicle, when transferring the weight of the respective end of the car to the spare tire and carrier.

It is a further object to provide a device of this class in which the spare tire is moved downwardly from the normally carried height to contact with the street or floor surface, and to provide for transferring the weight of the respective end of the vehicle to said tire by continuation of the same downward movement; and to construct the tire lowering mechanism so that the vehicle elevating action of said tire is automatically made slower than the initial lowering movement of same.

It is a further object to provide a manually disengageable means for instantly transmitting the automobile elevating force to the spare tire, and a manually disengageable means for promptly transmitting the automobile parking movement to same, as required.

It is also an object to provide an oscillatable frame upon which said spare tire and carrier are swung from normal parking position, and shaft means embodying a flexible shaft joint, the flexing center of which approximately coincides with the oscillating center line of said frame.

The foregoing and other objects are attained by the structure illustrated in the accompanying drawings, in which similar characters of reference designate similar parts throughout the different views.

Figure 1:
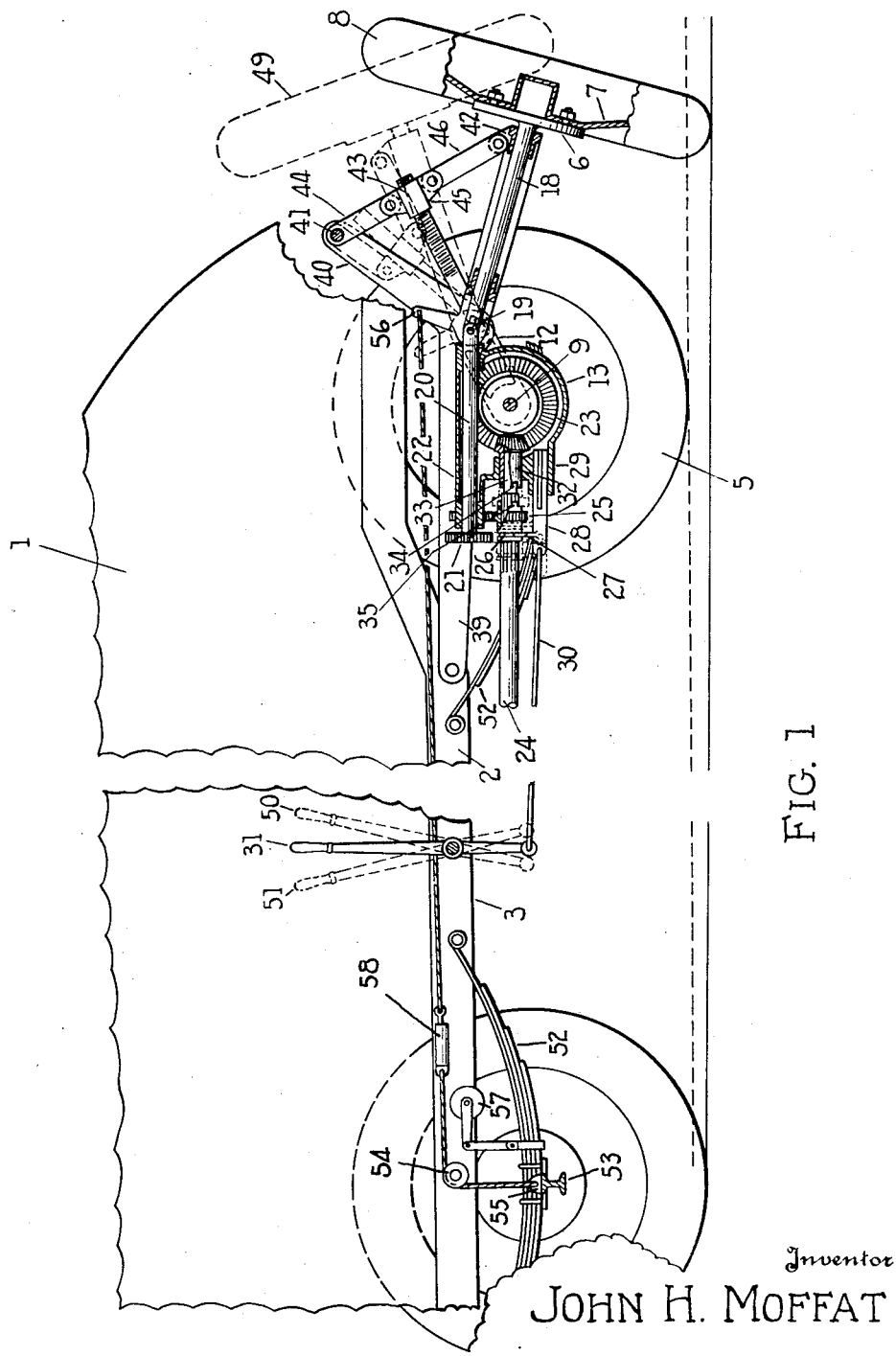
Figure 2:
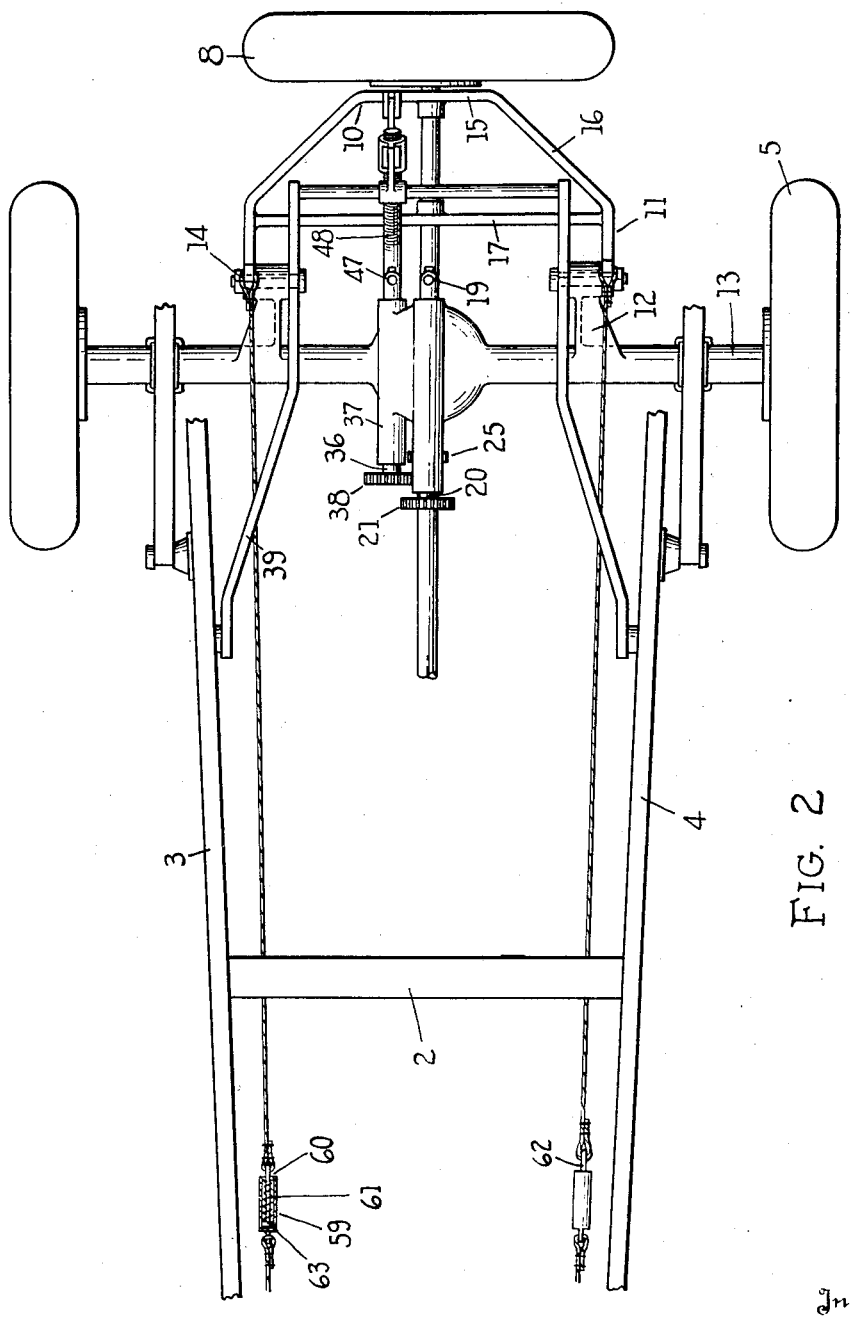

Figure 1 is a fragmentary sectional side view of an automobile embodying the device; and, Figure 2 is a corresponding plan view of Fig. 1.

Referring to Fig. 1, the numeral 1 designates a typical automobile body which is supported upon the chassis 2, said chassis having side rails 3 and 4, as better understood from Fig. 2, and being provided with the traction and supporting wheels, 5.

Considerable difficulty has been experienced in parking automobiles "flat" to the curb, on crowded streets and the like, in places where a number of other vehicles are thus parked end to end, it being necessary in many instances to "zig-zag" an automobile into parked position between other vehicles by manipulating same backward and forward a number of times, as there are many occasions at which one is thus required to park in a space scarcely longer than the automobile under operation. In view of such difficulties, this device is provided for moving one end of the automobile bodily sideways to the curb, the other end of the automobile having already been placed in approximate parking position by manipulating same on the automobile wheels.

The invention comprises a wheel and tire carrier 6, upon which is mounted the spare or extra wheel 7 and tire 8, in substantially the usual position of rearwardly mounted spare tires, the axial center of said carrier being transverse to the vehicle axle means 9. Said tire carrier is a yoke like frame 10, having forwardly extending clevis like bosses 11, which are pivoted to the rearwardly extending brackets 12, of the rear axle housing 13, by means of horizontal hinge bolts 14. The rearward portion of said frame comprises an elongated member 15, which is conveniently parallel to the axle housing 13, and in this example of the invention said member is integrally united at its ends with the frame bosses 11, by angularly arranged frame sections 16. A strut 17 spans said frame conveniently between the junctures of said bosses and said frame sections, said strut being parallel with the member 15.

The spare wheel and tire carrier 6, is fixed to the rearward end of the axle 18 which is journaled through midway points of the member 15 and strut 17. Immediately forward of said strut the axle 18 is provided with a flexible driving joint 19, the center of flexation of same being approximately in the center line of the hinge bolts 14. The forward part of said flexible joint is concentrically mounted on the rearward end of the shaft 20 upon the forward end of which the spur gear 21 is likewise mounted. Said shaft is journaled between said flexible joint and said gear through the bearing 22, which is embodied with the upper wall structure of the axle housing 13, said shaft being thus positioned in longitudinal alignment with the automobile as a whole, midway of said housing. The rear axle means 9, is driven through conventional differential axle gearing 23, by the usual axle drive shaft 24, which in turn is driven by the automobile engine (not shown) through any standard or preferred automobile clutch and transmission (not shown). The driving spur gear 25 is slidably splined to said drive shaft and is adapted to be shifted forwardly and rearwardly thereon. The forwardly extending hub of said driving gear forms the concentric shifting groove 26. Said groove is engaged by the tongue 27 of the gear shift 28, which is slidably disposed in the guide 29, said guide being fixed to the axle housing 13. The rearward end of the shifting rod 30 is pivoted to said shifter and the forward end of said rod is likewise pivoted to the shifting lever 31, which in turn is pivoted to the automobile frame or body within convenient reach of the operator, by which arrangement it will be clearly understood that the operator may shift the drive gear 25 into and out of driving relation with the spur gear 21, at will.

The drive shaft 24 drives the axle gearing 23 through the pinion shaft 32, which is arranged as a continuation thereof and into which the reduced rearward termination 33 of said drive shaft telescopes and is rotatably supported. The forward end of the pinion shaft 32 forms the radially arranged slots 34, and corresponding radially arranged tongues 35 are formed on the rearward hub end of the gear 25, said tongues being adapted to enter said slots and thus constitute therewith a disengageable driving connection between said drive shaft and said pinion shaft. It will therefore be understood that when the driving gear 25 is shifted rearwardly to its extreme rearward portion the said drive shaft is coupled with said pinion shaft, and is thus in position to drive the axle 9, through the gearing 23.

The shaft 36 is positioned to one side of the shaft 20 parallel thereto and loweredly thereof, and journals through the bearing 37, also formed through the axle housing 13. Spaced forwardly from the gear 25 when said gear is in its most rearward position, and rearwardly of the gear 21, the spur gear 38 is mounted on the forward end of the shaft 36 with sliding range of the gear 21. By this arrangement the driving gear 25 is shifted by operation of the lever 31 into mesh with the gear 38 and then with the gear 21, as will be further understood.

To each of the frame side rails 3 and 4, and forwardly of the axle housing 13, the forward end of one of the bars 39 is pivoted, said bars extending to pivoted connection with the respective bracket 12, conveniently through engagement with the frame hinge bolts 14. An arm 40 extends from each of said brackets, upwardly and somewhat rearwardly of said hinge pins, the upper extremities of said arms being united by the yoke bar 41. Said yoke bar is connected to the ears 42, which are formed on and extend upwardly from the frame member 14, by a toggle 43, said toggle consisting of the upper link 44, the toggle head 45, and the lower toggle link 46. The upper end of said upper link pivots on said yoke bar, and the lower end thereof pivots to said toggle head. Likewise one end of said lower link is pivoted to said head and one end to the ears 42. The rearward end of the shaft 36 is provided with a flexible shaft connection 47, with which it is united with the screw 48, said screw being threaded through the toggle head 45. By this provision and arrangement of parts it is evident that rotation of the screw 48 in the proper direction, by the shaft 36, through the gears 25 and 38, will draw the toggle 43 into folded position as indicated by dotted lines 49, of Fig. 1, and permit same to unfold as illustrated by solid lines, by rotation of the screw 48 in the opposite direction.

In parking an automobile equipped with the invention, the front end of the vehicle is headed into approximately parked position. Since this first step is carried out by forward overland movement, the automobile transmission is set to impart movement at one of the forward speeds, preferably the lowest. The regular automobile clutch is then disengaged and the vehicle is brought to a stop. The lever 31 is then moved from the position shown in dotted lines 51 to the position indicated by the solid lines, shifting the drive gear 25 into mesh with the gear 38 and disengaging said drive gear from the pinion shaft and uncoupling the drive shaft 24 from the gearing 23. The automobile clutch is then engaged and the drive shaft 24 is rotated as in driving the vehicle forward. The screw 48, thus correspondingly rotated, through the drive gear 25, the gear 38, the shaft 36, and the flexible joint 47, the toggle 43 is drawn to unfolded position as indicated by solid lines in Fig. 2. The frame 10 is swung correspondingly downward on the hinge bolts 14, and the spare tire 8 being forced against the street, road or floor surface, as the case may be, the traction wheels 5 are forced upwardly from supporting contact. The automobile clutch is then again disengaged, and the lever 31 is swung to the position indicated by the dotted lines 50, bringing the drive gear 25 into mesh with the gear 21. The automobile clutch being again engaged, the spare tire 8 is rotated by the gear 21 through the shaft 20, flexible joint 19, axle 18, spare wheel carrier 6, and spare wheel 7, and the rearward end of the vehicle is thus carried laterally toward the curb into parked position, wherefrom the automobile clutch is again disengaged, the transmission is set in neutral, and the parking operation is completed. In removing the vehicle from parked position, the same steps are repeated in reverse order; the transmission being set for backward overland movement, the spare tire 8 being rotated in the opposite direction. The screw 48 is likewise rotated in the opposite direction and the toggle 43 being moved to folded position the frame 10, tire 8, etc. are moved to idle position as indicated by the dotted lines 49 in Fig. 1. The automobile clutch is then disengaged, the drive gear 25 is shifted into interlocking relation with pinion shaft 32 and the vehicle may be driven away.

Referring to the toggle 43 as illustrated in folded position by dotted lines 49, of Fig. 1, it will be observed that the link 44 of said toggle is parallel with the frame arms 40, when said link is in folded position, said links being substantially parallel with a plane passing through the center line of the yoke bar 41, and the pivot bolts 19, by which it will be understood that the lateral shifting of said arms 40, is substantially codirectional with the initial lateral unfolding movement of the link 44. By this arrangement change of position of said arms due to the yielding and return of the vehicle springs 52, and the corresponding oscillation of the bars 39, on the pivot bolts 19, resulting by the pivotal movement of said bars in relation to the chassis side rails 3 and 4, will swing the link 44 in relation to the toggle head 43, which with the toggle link 46 is thus saved from jar caused by movement of the vehicle body on the springs 52, when driving over rough roads, and the tire carrier 7, which is supported by the toggle link 46, is therefore not subjected to sudden shock by change in positional relation between the vehicle body and axle housing 13.

When the rearward end of the vehicle is supported by the spare tire 8, as described, it is an object to dampen or control within certain limits the action of the front vehicle springs which are usually arranged in pairs, one spring of each supporting one front corner of the vehicle on the front axle 53, and at the same time permit active full length movement of said springs.

This is conveniently accomplished by pivoting a grooved pulley 54 to each of the side rails 3 and 4, approximately over the front axle 51, and threading a cable means from its connection 55, with said front axle, forwardly of and rearwardly over said pulleys to upwardly extending arms 56, formed on the bosses 11 of the frame 10. When the frame 10 is swung downward in lowering the spare tire 8, said cable means tightens between said pulleys and said front axle, thus resisting the return movement of the vehicle front spring, independently of the shock absorbers 57, but not effecting the yielding movement of same in any way. A spring mechanism 58 forms a part of each of said cable means, one section of said cable being secured to the cylinder 59 at one end thereof, said cylinder forming an inwardly extending shoulder 60 at the other end, said shoulder forming a seat for one end of the expansion coil spring 61, which is contained within said cylinder. The other section of each cable is secured to the exposed end of the rod 62, which passes through said spring and which forms the shoulder 63 on the other end of said rod, said shoulder forming a seat for the other end of said spring. It will thus be understood that taughtness of said cable means beyond a certain degree will draw the shoulders 60 and 63 nearer each other against the tension of the spring 61, and that if return movement of the front vehicle springs occurs when the cable means are thus tightened by lowering the spare tire 8, the springs 61 yield to such return movement but retarding same sufficiently to steady the body of the vehicle, and at the same time actually permitting the complete return movement of said vehicle springs.

While the description and drawings illustrate in a general way certain instrumentalities which may be employed in carrying the invention into effect, it is evident that many modifications may be made in the various details without departing from the scope of the appended claims, it being understood that the invention is not restricted to the particular examples herein described.

The invention claimed is:

1. In conjunction with a vehicle having forward and rearward axles, a chassis, and springs connecting said chassis with said axles, the combination with a spare tire carrier, a spare tire carrier support comprising a frame, one end of which is pivoted to the chassis between the axles, the other end of said frame being flexibly connected to said support at one end of the vehicle beyond the respective axle and said frame being pivoted to said respective axle, between its said ends.

2. In conjunction with a vehicle having forward and rearward axles, a chassis, and springs connecting said chassis with said axles, the combination with a spare tire carrier, a toggle means supporting said carrier, a spare tire carrier support comprising a frame, one end of which is pivoted to the chassis between the axles, the other end of said frame supporting said toggle means at one end of the vehicle beyond the respective axle, and said frame being pivoted to said respective axle, between its said ends.

3. In conjunction with a vehicle having forward and rearward axles, a chassis, and springs connecting said chassis with said axles, the combination with a spare tire carrier, a foldable toggle means supporting said carrier at a given height when folded and at another height when unfolded, said toggle being constructed of toggle links, a spare tire carrier support comprising a frame, one end of which is pivoted to the chassis between the axles, said frame being pivoted to one of the vehicle axles between the frame ends, and the other end of said frame being pivotally connected to said toggle at a point in a line substantially parallel to one of the links in said toggle, said line passing through the pivotal center of the connection between said frame and axle.

4. In a vehicle parking mechanism for vehicles embodying a propulsion power source, an auxiliary wheel rotatable about an axis transverse to the normal axial lines of the regular vehicle wheels, a means to guide said wheel into vehicle supporting contact with the supporting surface of the vehicle, a means serving to drive an axle of the vehicle from such power source, a means serving to change the height of said auxiliary wheel by motion transmitted from such source, a means serving to rotate said auxiliary wheel by motion transmitted from said power source, means serving to disconnect said power source and vehicle axle from operative relation when motion is transmitted from said power source to said auxiliary wheel, and a single reversing means serving to reverse the rotation of said axle means, said single reversing means also serving to reverse the rotary motion of said auxiliary wheel.

5. In conjunction with vehicles having a propulsion power source, a vehicle spare tire parking mechanism for a vehicle having removable tires, a spare tire carrier serving to carry an extra vehicle tire for emergency use, said carrier having a concentrically disposed spindle with which it is rotatable, said carrier being rotatable upon said spindle about an axis transverse to the normal axial lines of the vehicle wheels, a means serving to guide said spare tire with said carrier into vehicle supporting contact with the supporting surface of the vehicle, the movements of said means to guide being independent of the rotation of said carrier upon said spindle, a means serving to change the height of said spare tire and carrier by motion transmitted from said source, a means serving to rotate said auxiliary wheel from motion transmitted from said power source, means serving to disconnect said power source and vehicle axle from operative relation when motion is transmitted from said power source to said spare tire and carrier, and a single propeller shaft, through which an axle of the vehicle is driven from said power source, said single propeller shaft serving to drive the means to rotate and the means to change the height of said spare tire and carrier.

6. In conjunction with vehicles having a propulsion power source, a vehicle spare tire parking mechanism for a vehicle having removable tires, vehicle wheels driven by such power source, a spare tire carrier serving to carry an emergency spare vehicle tire, said tire carrier having a concentrically disposed spindle with which it is rotated, a means serving to guide said carrier to different heights, the movements of said means being independent of the rotation of said carrier with said spindle, means through which the height of said carrier is changed by action of said power source, a means serving to rotate said spindle by motion transmitted from said power source, means for coupling and uncoupling said mechanism from height changing operation of said tire carrier at will, and a single reversing means serving to drive and reverse the driven vehicle wheels, said single reversing means serving also to reverse the rotary motion of said spindle.

7. In conjunction with vehicles having a power source, a vehicle spare tire parking mechanism for a vehicle having removable tires, vehicle wheels driven by such power source, a spare tire carrier serving to carry an emergency spare vehicle tire, said tire carrier having a concentrically disposed spindle with which it is rotated by motion transmitted from said power source, means serving to change the height of said spindle by motion transmitted from said power source, means for coupling and uncoupling said spindle from rotating operation by said power source, at will, means to disassociate the driven vehicle wheels from said power source when said tire carrier is rotated by said power source, and a single propeller shaft through which the driven wheels of the vehicle are driven, said single propellor shaft serving to drive the means to rotate and the means to change the height of said spindle.

8. In a vehicle parking mechanism for vehicles embodying a propulsion power source, an auxiliary wheel rotatable about an axis transverse to the normal axial lines of the regular vehicle wheels, a means to guide said wheel into vehicle supporting contact with the supporting surface of the vehicle, a means to drive an axle of the vehicle from such power source, a means to change the height of said auxiliary wheel by motion transmitted from such source, a means to rotate said auxiliary wheel concentrically by motion transmitted from said power source, and means serving to disconnect said power source from said means to change the height of said auxiliary wheel, when motion is transmitted from said power source to said auxiliary wheel, and a single reversing means serving to reverse the rotation of the driven axle, said single reversing means also serving to reverse the rotary motion of said auxiliary wheel, and to reverse the height changing movement of same.

9. In a vehicle parking mechanism for vehicles embodying a propulsion power source, an auxiliary wheel rotatable about an axis transverse to the normal axial lines of the regular vehicle wheels, a single propeller shaft driven by said power source, a means to bring said wheel into vehicle supporting contact with the supporting surface of the vehicle, a means to drive an axle of the vehicle by power transmitted through said propeller shaft from such power source, a means to change the height of said auxiliary wheel by power transmitted through said propeller shaft from such source, a means to rotate said auxiliary wheel concentrically by power transmitted through said propeller shaft from said power source, and means serving to disconnect said power source and said auxiliary wheel when motion is transmitted from said power source to said means to change the height of said auxiliary wheel.

10. In a vehicle parking mechanism for vehicles embodying a propulsion power source, an auxiliary wheel rotatable about an axis transverse to the normal axial lines of the regular vehicle wheels, a means to guide said wheel into vehicle supporting contact with the supporting surface of the vehicle, a means to drive an axle of the vehicle from such power source, a means to change the height of said auxiliary wheel by motion transmitted from such source, a means to rotate said auxiliary wheel concentrically by motion transmitted from said power source, means serving to disconnect said power source and vehicle axle from operative relation, when motion is transmitted from said power source to said auxiliary wheel and said means to change the height of said auxiliary wheel, and a single reversing means serving to reverse the rotation of the driven axle, said single reversing means also serving to reverse the rotary motion of said auxiliary wheel and to reverse the height changing movement of same.

JOHN H. MOFFAT.